United States Patent
Sakuma et al.

(10) Patent No.: US 8,034,434 B2
(45) Date of Patent: Oct. 11, 2011

(54) TRANSPARENT MOLDED BODY AND ANTIREFLECTIVE MEMBER USING THE SAME

(75) Inventors: Satoshi Sakuma, Yokohama (JP); Eiko Okamoto, Hatsukaichi (JP); Yoshihiro Uozu, Sagamihara (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/526,195

(22) PCT Filed: Feb. 8, 2008

(86) PCT No.: PCT/JP2008/052191
§ 371 (c)(1),
(2), (4) Date: Jan. 21, 2010

(87) PCT Pub. No.: WO2008/096872
PCT Pub. Date: Aug. 14, 2008

(65) Prior Publication Data
US 2010/0323165 A1    Dec. 23, 2010

(30) Foreign Application Priority Data
Feb. 9, 2007   (JP) ................................ 2007-030277

(51) Int. Cl.
*B32B 3/00*    (2006.01)
*B32B 3/30*    (2006.01)
*G02F 1/00*    (2006.01)

(52) U.S. Cl. ........ 428/172; 428/141; 428/167; 428/913; 359/321; 359/601

(58) Field of Classification Search .................. 428/141, 428/167, 172, 913; 359/321, 493.01, 601
See application file for complete search history.

(56) References Cited

FOREIGN PATENT DOCUMENTS

| JP | S63-75702 | 4/1988 |
| JP | 7-316468 | 12/1995 |
| JP | 11-217560 | 8/1999 |
| JP | 2001-183506 | 7/2001 |
| JP | 2001-315247 | 11/2001 |
| JP | 2003-172808 | 6/2003 |
| JP | 2005-43749 | 2/2005 |
| JP | 2005-97371 | 4/2005 |
| JP | 2005-156695 | 6/2005 |
| JP | 2006-147149 | 6/2006 |

*Primary Examiner* — Donald J Loney
(74) *Attorney, Agent, or Firm* — Morgan, Lewis & Bockius LLP

(57) ABSTRACT

The present transparent molded body is a transparent molded body including a transparent substrate and an uneven layer composed of a cured product of an active energy ray-curable composition formed on at least one surface of the transparent substrate, wherein the uneven layer has an uneven structure having a gap between the adjacent convex portions equal to or less than the wavelength of a visible light, the water contact angle of the surface of the uneven layer is equal to or less than 25°, and the modulus of elasticity of the surface of the uneven layer is equal to or more than 200 MPa.

5 Claims, 1 Drawing Sheet

TRANSPARENT MOLDED BODY AND ANTIREFLECTIVE MEMBER USING THE SAME

TECHNICAL FIELD

The present invention relates to a transparent molded body and an antireflective member using the same.

The present invention claims priority benefit based on Japanese Patent Application No. 2007-30277 filed on Feb. 9, 2007, the content of which is incorporated herein by reference in its entirety.

BACKGROUND ART

Interfaces (surfaces) that come in contact with air, such as a variety of displays, lenses, show windows, and the like suffer a problem of reduced visibility due to the reflection of solar light, lighting, or the like on their surfaces. As a method for reducing the reflection, a method for laminating several layers of films having different refractive indices so as to match and cancel by interference the reflected light on the film surface and the reflected light at the interface between the film and the base. These films are usually prepared by a method such as sputtering, evaporation, coating, and the like. However, in these methods, there is a limitation on the reduction in the reflectivity and the dependency of the reflectivity on the wavelength even when the number of laminated films is increased. Also, in order to reduce the number of lamination layers to achieve a reduction in the manufacturing cost, there has been a demand for a material having a lower refractive index.

In order to decrease the refractive index of a material, it is effective to use a method of introducing air into the material, for example, a method for forming a fine uneven structure on the surface of a film is widely known. By this method, the refractive index of the whole layers on the surface having a fine uneven structure formed thereon is determined by a volume ratio between the air and the material for forming the fine uneven structure, and as a result, it is possible to remarkably reduce the refractive index, whereby the reflectivity can be reduced even with a small number of lamination layers.

Further, as an antireflective film formed on a glass substrate, there has been proposed an antireflective film in which convex portions having a pyramid shape are continuously formed on the entire film (for example, see Patent Document 1). As described in Patent Document 1, for the antireflective film in which the convex portions having a pyramid shape (fine uneven structure) are formed, the cross-section upon cutting in the film thickness direction continuously changes, and the refractive index gradually increases from the air to the substrate, which thus can be an effective antireflective matters. Also, the antireflective film exhibits excellent optical performances which cannot be reproduced by other methods.

Since the antireflective film with the fine uneven structure as described above is used at an interface in contact with air, it is usually and preferably has imparted thereto an antifouling property and scratch resistance.

As a method for imparting an antifouling property, methods have been proposed for imparting an antifouling property by shedding soiling matter by reducing the surface energy, such as a method in which a coating film including polytetrafluoroethylene is formed on the surface of a fine uneven structure (for example, see Patent Document 2), a method in which a stamper having a fine uneven structure is brought into pressure-contact with a layer formed of a resin composition comprising a fluorine-containing compound (for example, see Patent Document 3), and the like.

Moreover, methods have also been proposed for wiping the attached soiling matter off by floating it on water using surface hydrophilization, such as a method in which a photocatalyst layer (titanium oxide, and the like) having a fine uneven structure is coated on a base surface (for example, see Patent Document 4), a method in which a hydrophilic coating film including inorganic oxides such as a silicic acid compound, and the like is formed on a base surface by sputtering (for example, see Patent Document 5), a method in which an inorganic fine particle solution is spin-coated on the surface of a soda glass and cured by heating (for example, see Patent Document 6), and the like.

As a method for imparting scratch resistance, as in Patent Documents 5 and 6 as above, a method in which inorganic fine particles are dispersed on a coating film or a high hardness resin obtained by curing crosslinkable polyfunctional monomers is generally used.

In addition, without involving a fine uneven structure, a few methods in which a hydrophilic monomer and a polyfunctional monomer are combined to realize the compatibility between the antifouling property and the scratch resistance (for example, see Patent Document 7) have been proposed.

However, the active energy ray-curable resin as described in Patent Document 1 is not hydrophilic, and thus, it has a water contact angle of more than 25°, and as a result, it does not exhibit the antifouling property.

Further, if the surface energy is reduced as described in Patent Documents 2 and 3, little soiling substance adheres, but the soil is caught in the concave portion, and thus, there was a problem that once the soiling substance is embedded, it is hard to remove in use.

In addition, as described in Patent Document 4, in the case of using a photocatalyst, it was difficult for the decomposition of dust to proceed indoors. Also, if a resin film or the like was used as a base and its surface was coated with a photocatalyst layer, there were problems such as the decomposition of even the resin film.

Moreover, with the antifouling article having a fine uneven structure obtained by the preparation method as described in Patent Documents 5 and 6, there were problems in that it was difficult to control the distance between the adjacent convex portions or the height of the convex portion, and that the antireflective property could not be sufficiently obtained.

Furthermore, even though the method as described in Patent Document 7 was applied to a fine uneven structure, there was a problem in that the antifouling property is not sufficiently enforced.

[Patent Document 1] JP-A-63-75702
[Patent Document 2] JP-A-2003-172808
[Patent Document 3] JP-A-2005-97371
[Patent Document 4] JP-A-2001-183506
[Patent Document 5] JP-A-2001-315247
[Patent Document 6] JP-A-11-217560
[Patent Document 7] JP-A-7-316468

DISCLOSURE OF THE INVENTION

Problem that the Invention is to Solve

The present invention has been made taking into consideration the above circumstances, and it is an object thereof to provide a transparent molded body in which an active energy ray-curable resin having a fine uneven structure with a good antifouling property and scratch resistance is formed on the surface.

Means for Solving the Problem

The transparent molded body of the present invention is a transparent molded body including a transparent substrate and an uneven layer composed of a cured product of an active energy ray-curable composition formed on at least one surface of the transparent substrate, wherein the uneven layer has an uneven structure having a gap between the adjacent convex portions that is equal to or less than the wavelength of visible light, the water contact angle of the surface of the uneven layer is equal to or less than 25°, and the modulus of elasticity of the surface of the uneven layer is equal to or more than 200 MPa.

Here, the active energy ray-curable resin which forms the uneven layer preferably comprises a polymer composed of 10 to 50 parts by weight of tetrafunctional or greater polyfunctional (meth)acrylate units, 30 to 80 parts by weight of bifunctional or greater hydrophilic (meth)acrylate units, and 0 to 20 parts by weight of monofunctional monomer units.

The bifunctional or greater hydrophilic (meth)acrylate units are preferably polyethylene diacrylate units (the number of the average repeating units of ethylene glycol is preferably 6 to 40 or more preferably 9 to 30).

The antireflective member of the present invention is characterized by the use of a transparent molded body.

EFFECTS OF THE INVENTION

According to the present invention, it is possible to realize a transparent molded body, in which an active energy ray-curable resin having an uneven structure with a good antifouling property and scratch resistance is formed on the surface.

DESCRIPTION OF REFERENCE NUMERALS AND SIGNS

10: Transparent molded body
11: Transparent base
12: Active energy ray-curable resin
13: Convex portion
14: Concave portion

BEST MODE FOR CARRYING OUT THE INVENTION

Hereinbelow, the present invention will be described in detail.

Figure 1:
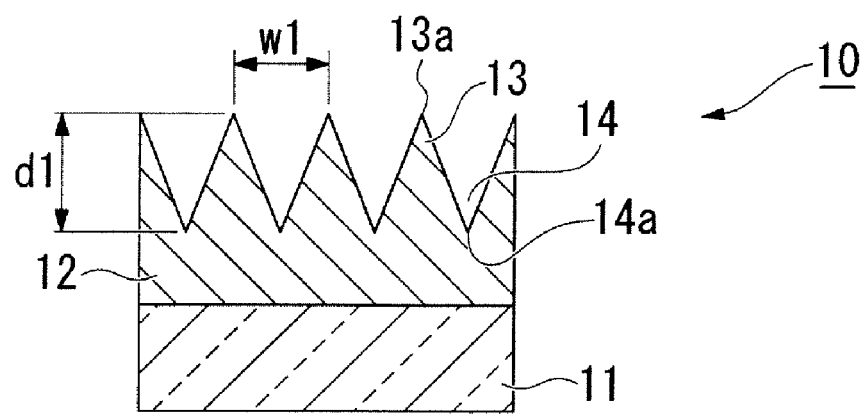
FIG. 1 is a longitudinal cross-section view showing an example of the transparent molded body of the present invention.

FIG. 1 is a longitudinal cross-section view showing an example of the transparent molded body 10 of the present invention. The transparent molded body 10 is a body in which the active energy ray-curable resin 12 is formed on the surface of the transparent base 11 to be described below. In the transparent molded body 10, a fine uneven structure is formed on its surface, and the surface of the fine uneven structure has a water contact angle equal to or less than 25°.

The fine uneven structure may be formed on the entire surface of the transparent molded body 10 or the fine uneven structure may be formed on a part of the surface. Particularly, in the case where the transparent molded body 10 has a film shape, the fine uneven structure may be formed on the entire surface on one side or the fine uneven structure may be formed on a part of the surface on one side. Also, the fine uneven structure may be formed on the surface on the other side or may not be formed. Since the uneven structure is usually formed through self-organization, the acquired shape may sometimes be uniform or may sometimes by non-uniform.

The fine uneven structure is preferred in the case where the transparent molded body is an antireflective member since the fine uneven structure can exhibit an antireflective property if the distance w1 between the adjacent convex portions is equal to or less than the wavelength of visible light. If the distance w1 is more than the wavelength of visible light, the scattering of visible light occurs on the surface on which the fine uneven structure is formed, which is thus not suitable for optical applications such as an antireflective member and the like. In addition, it is difficult to prepare a fine uneven structure having a distance w1 of less than 30 nm.

Furthermore, as used in the present invention, the expression "wavelength of visible light" means a wavelength of 400 nm.

The height d1 of the convex portion 13 is preferably equal to or more than 100 nm, and more preferably equal to or more than 150 nm. If it is less than 100 nm, the minimum reflectivity increases or the reflectivity at a certain wavelength increases, and as a result, in the case where the transparent molded body is an antireflective member, the antireflective property becomes insufficient.

The aspect ratio (the height of the convex portion 13/the gap between the adjacent convex portions) is preferably from 1.0 to 5.0, more preferably from 1.2 to 4.0, and most preferably from 1.5 to 3.0. If the aspect ratio is less than 1.0, the minimum reflectivity increases or the reflectivity at a certain wavelength increases, and as a result, in the case where the transparent molded body is an antireflective member, the antireflective property becomes insufficient. Accordingly, if the aspect ratio is more than 5, the convex portions are likely to be folded upon rubbing, and thus, the scratch resistance is reduced or the antireflective performance is not exhibited.

Further, as used in the present invention, the expression "the height of the convex portion" refers to a vertical distance from the edge 13a of the convex portion 13 to the bottom 14a of the adjacent concave portion 14, as shown in FIG. 1.

Figure 2:
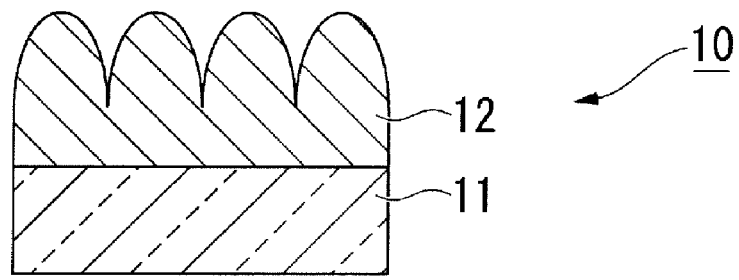
FIG. 2 is a longitudinal cross-section view showing another example of the transparent molded body of the present invention.

In addition, the shape of the convex portion 13 of the fine uneven structure is not particularly limited, but it will preferably have a structure in which the share of the cross-sectional area increases upon cutting in the film thickness direction, for example, it may have a substantially conical shape as shown in FIG. 1 in order to continuously increase the refractive index and obtain thereby an antireflective function with compatibility between low reflectivity and low dependency on the wavelength, a bell shape as shown in FIG. 2, and the like. Also, the fine uneven structure as described above may be formed by combination of a plurality of finer convex portions.

In the transparent molded body of the present invention, the fine uneven structure as described above is formed on its surface. The surface of the fine uneven structure preferably has a water contact angle that is equal to or less than 25°, more preferably equal to or less than 23°, and most preferably equal to or less than 21°. If the water contact angle is more than 25°, a sufficient antifouling property is not exhibited and it becomes difficult to wipe off soiling matter such as oil and fat, and the like. Further, if the water contact angle is less than 3°, the resin is swollen by water absorption and the uneven shape changes, and accordingly, the desired antireflective characteristics may not be exhibited in some cases. Therefore, a water contact angle equal to or more than 3° is preferred. In order to provide a water contact angle equal to or less than 25°, a material constituting the fine uneven structure may be appropriately selected. Also, in the case where the transparent molded body of the present invention has a film shape, such as, for example, a film, if the fine uneven structure as described above is formed on the entire surface or a part thereof on one side and the surface has a water contact angle that is equal to or less than 25°, the surface on the other side, when it has a fine uneven structure, may have a water contact angle on the surface of more than 25°.

Furthermore, the modulus of elasticity of the surface of the fine uneven structure is measured in the method as described in Examples using a "FISCHERSCOPE® HM2000" manufactured by Fischer Technology, Inc. The modulus of elasticity of the surface is preferably equal to or more than 200 MPa, and more preferably equal to or more than 600 MPa. If the modulus of elasticity is less than 200 MPa, sufficient scratch resistance is not exhibited. Also, if the modulus of elasticity is more than 3500 MPa, for example, in the case of forming a resin having a fine uneven structure on a transparent base, the resin cannot follow the deformation of the transparent base, and accordingly, small cracks are incorporated in the resin. As a result, the modulus of elasticity of the surface is preferably equal to or less than 3500 MPa, more preferably equal to or less than 3000 MPa, and most preferably equal to or less than 2500 MPa.

The method for forming a fine uneven structure on the surface of the transparent molded body is not particularly limited, but examples thereof include a method involving injection molding or press molding using a stamper having a fine uneven structure formed thereon, a method involving charging an active energy ray-curable composition between a stamper having a fine uneven structure formed thereon and a transparent base, curing the active energy ray-curable composition by the irradiation of an active energy ray, transferring the uneven shape of the stamper, and then releasing the active energy ray-curable composition, and a method involving charging an active energy ray-curable composition between a stamper having a fine uneven structure formed thereon and a transparent base, transferring the uneven shape of the stamper to the active energy ray-curable composition, and releasing and then curing the active energy ray-curable composition by the irradiation of an active energy ray. Among these, taking into consideration of the transfer property of the uneven structure and the freedom of the surface composition, the method involving charging an active energy ray-curable composition between a stamper having a fine uneven structure formed thereon and a transparent base, curing the active energy ray-curable composition by the irradiation of an active energy ray, transferring the uneven shape of the stamper, and then releasing the active energy ray-curable composition is suitable for the present invention.

The transparent base used in the present invention is not particularly limited as long as it allows light penetration. Example thereof include a methyl methacrylate (co)polymer, a polycarbonate, a styrene (co)polymer, a methyl methacrylate-styrene copolymer, cellulose diacetate, cellulose triacetate, cellulose acetate butyrate, a polyester, a polyamide, a polyimide, polyether sulfone, polysulfone, polypropylene, polymethylpentene, polyvinyl chloride, polyvinyl acetal, polyether ketone, polyurethane, a glass, a crystal, and the like. The transparent base may be prepared by any method among injection molding, extrusion molding, and cast molding methods.

The shape of the transparent base is not particularly limited and can be appropriately selected according to the transparent molded body to be prepared, but for example, in the case where the transparent molded body is an antireflective film or the like, a sheet shape or a film shape is preferred. Also, in order to improve the adhesion with the active energy ray-curable composition, the antistatic property, the scratch resistance, the weather resistance, and the like, the surface of the transparent base may be subjected, for example, to various coating treatments or a corona discharge treatment.

The method for preparing a stamper 20 having a fine uneven structure formed thereon as shown in FIG. 3 is not particularly limited, but examples thereof include an electron beam lithographic method, a laser light interference method, and the like. For example, an appropriate photoresist film is applied on an appropriate supporting substrate, exposed using a light such as an ultraviolet laser, an electron beam, an X ray, and the like, and then developed, thereby providing a mold having a fine uneven structure. This mold can be used as a stamper as it is, but it is also possible that a photoresist layer is inserted thereinto, the supporting substrate is selectively etched by dry etching, and then the photoresist layer is removed, thereby directly forming a fine uneven structure on the supporting substrate itself.

Furthermore, an anodized porous alumina can be used as a stamper. For example, as disclosed in JP-A-2005-156695, an alumina nanohole array obtained by a method in which aluminum is anodized at a predetermined voltage in an electrolytic liquid of oxalic acid, sulfuric acid, phosphoric acid, or the like, can also be used as a stamper. By this method, by anodizing high purity aluminum at a constant voltage for a long time and subsequently first removing the oxidized film, followed by further anodization, extremely uniform pores can be formed by self-organization. Further, when re-anodizing, the concave portion can also form a bell-shaped fine uneven structure, in addition to a substantially conical shape, by the combination of an anodizing treatment and a treatment for increasing the hole diameter. Further, a replicated form can be prepared by an electroforming method from an original/master form having a fine uneven structure and also used as a stamper.

The shape of the stamper thus fabricated is not particularly limited, and as a result, it may have a flat plate shape or a roll shape, but by selecting the roll shape, a fine uneven structure can be continuously transferred to the active energy ray-curable composition, thereby increasing the productivity, which is thus preferable. The active energy ray-curable composition used in the present invention refers to a composition obtained by suitably mixing a monomer having a radically polymerizable and/or cationically polymerizable bond in the molecule, a low polymerization degree polymer, and a reactive polymer, wherein the composition is cured by a polymerization initiator to be described below. Further, a non-reactive polymer may be added.

The active energy ray-curable resin is composed of at least one monomer unit, but in order to impart a water contact angle equal to or less than 25°, it is preferably composed of 10 to 50 parts by weight of tetrafunctional or greater polyfunctional (meth)acrylate units, 30 to 80 parts by weight of bifunctional or greater hydrophilic (meth)acrylate units, and 0 to 20 parts by weight of monofunctional monomer units. Further, the tetrafunctional or greater polyfunctional (meth)acrylate units and the bifunctional or greater hydrophilic (meth)acrylate units may be the same as each other.

The (meth)acrylate unit is preferably tetrafunctional or greater, and a pentafunctional or greater monomer unit is more preferably used. Suitable examples thereof include ditrimethylolpropane tetra(meth)acrylate, pentaerythritol tetra(meth)acrylate, pentaerythritolethoxy tetra(meth)acrylate, dipentaerythritolhydroxy penta(meth)acrylate, dipentaerythritol hexa(meth)acrylate, a condensation reaction mixture of succinic acid/trimethylolethane/acrylic acid at a molar ratio of 1:2:4, urethane acrylates (manufactured by Daicel-Cytec Company, Ltd.: EBECRYL 220, EBECRYL 1290, EBECRYL 1290K, EBECRYL 5129, EBECRYL 8210, EBECRYL 8301, KRM8200), polyether acrylates (manufactured by Daicel-Cytec Company, Ltd.: EBECRYL 81), modified epoxy acrylates (manufactured by Daicel-Cytec Company, Ltd.: EBECRYL 3416), polyester acrylates (manufactured by Daicel-Cytec Company, Ltd.: EBECRYL 450, EBECRYL 657, EBECRYL 800, EBECRYL 810, EBECRYL 811, EBECRYL 812, EBECRYL 1830, EBECRYL 845, EBECRYL 846, EBECRYL 1870), and the like are suitable. These polyfunctional (meth)acrylate units may be used singly or in combination of two or more kinds thereof. The tetrafunctional or greater polyfunctional (meth)acrylate units are preferably used in an amount of 10 to 50 parts by weight. From the viewpoint of the water resistance or the chemical resistance, they are more preferably used in an amount of 20 to 50 parts by weight, and most preferably used in an amount of 30 to 50 parts by weight. If the added amount is less than 10 parts by weight, the modulus of elasticity is too low, and thus, the scratch resistance is reduced, whereas if the added amount is more than 50 parts by weight, small cracks are incorporated on the resin surface, and thus, the appearance may deteriorate in some cases.

As the bifunctional or greater hydrophilic (meth)acrylate units, polyfunctional acrylates having a long chain polyethylene glycol, such as Aronix M-240, Aronix M260 (manufactured by Toagosei Co., Ltd.), NK ester AT-20E, NK ester ATM-35E (manufactured by Shin-Nakamura Chemical Co. Ltd.), and the like, and polyethylene glycol dimethacrylates are suitably used. In order to give a water contact angle equal to or less than 25°, the total number of the average repeating units of the polyethylene glycol chain present in one molecule is preferably from 6 to 40, more preferably from 9 to 30, and most preferably from 12 to 20. If the number of the average repeating units of the polyethylene glycol chain is less than 6, the hydrophilicity is not sufficient, and thus, the antifouling property is reduced, whereas if the number of the average repeating units of the polyethylene glycol chain is more than 40, the compatibility with the tetrafunctional or greater polyfunctional (meth)acrylate is reduced, thereby leading to a state in which the active energy ray-curable composition is separated. These hydrophilic (meth)acrylate units may be used singly or in combination of two or more kinds thereof. The bifunctional or greater hydrophilic (meth)acrylate units are preferably in the amount of 30 to 80 parts by weight, and more preferably in the amount of 40 to 70 parts by weight. If the added amount is less than 30 parts by weight, the hydrophilization of the surface is insufficient, and thus, the antifouling property is not sufficiently exhibited, whereas if the added amount is more than 80 parts by weight, the modulus of elasticity of the surface is reduced, and thus, the scratch resistance is also reduced.

The monofunctional monomer unit is not particularly limited as long as it is compatible with the tetrafunctional or greater polyfunctional (meth)acrylate unit and the bifunctional or greater hydrophilic (meth)acrylate unit, but suitable examples thereof include hydrophilic monofunctional monomers including monofunctional(meth)acrylates having a polyethylene glycol chain in an ester group, such as M-20G, M-90G, M-230G (manufactured by Shin-Nakamura Chemical Co. Ltd.), and the like, monofunctional(meth)acrylates having a hydroxyl group in an ester group, such as hydroxyalkyl(meth)acrylate, and the like, monofunctional acrylamides, and cationic monomers such as methacrylamido propyltrimethyl ammonium methylsulfate, methacryloyloxy ethyltrimethyl ammonium methylsulfate, and the like. Furthermore, a viscosity modulator such as acryloylmorpholine, vinyl pyrrolidone, and the like, an adhesion improver such as acryloyl isocyanates, and the like for improving the adhesion onto the transparent base, and others can also be used.

The monofunctional monomer units are preferably used in an amount of 0 to 20 parts by weight, and more preferably in an amount of 5 to 15 parts by weight. By introducing the monofunctional monomer units, the adhesion between the transparent base and the active energy ray-curable resin is improved. If the added amount is more than 20 parts by weight, the added amount of any one of the tetrafunctional or greater polyfunctional (meth)acrylate units and the bifunctional or greater hydrophilic (meth)acrylate units is insufficient, and thus, the antifouling property or the scratch resistance may not be sufficiently exhibited in some cases.

These monofunctional monomer units are low polymerization degree polymers obtained by (co)polymerization of one or two or more kinds, which may be blended into the active energy ray-curable composition in an amount of 0 to 35 parts by weight. Specific examples thereof include a 40/60 copolymerized oligomer ("MG Polymer" manufactured by MRC Unitec Co., Ltd.) of monofunctional (meth)acrylates having a polyethylene glycol chain in an ester group, such as M-230G (manufactured by Shin-Nakamura Chemical Co. Ltd.), and the like and methacrylamido propyltrimethyl ammonium methylsulfate, and others.

Furthermore, the active energy ray-curable composition may contain an antistatic agent, a release agent, an ultraviolet ray absorber, and fine particles such as colloidal silica, and the like, in addition to the above-described various monomers or low polymerization degree polymers.

Specific examples of the active energy ray-used for curing the active energy ray-curable composition include heat rays such as visible light, an ultraviolet ray, an electron beam, a plasma, an infrared ray, and the like.

The light irradiation of the active energy ray is carried out, for example, by using a high pressure mercury lamp. The energy amount of the light irradiation is not particularly limited as long as it is an energy amount that promotes the curing of the active energy ray-curable composition, but it is preferably, for example, from 100 to 5000 mJ/cm$^2$, more preferably from 200 to 4000 mJ/cm$^2$, and most preferably from 400 to 3200 mJ/cm$^2$. Since the light irradiation amount of the active energy ray has an influence on the curing degree of the active energy ray-curable composition, a change in the irradiation amount leads to a change in the curing degree even at the same composition, and correspondingly, to a change in the modulus of elasticity. By this, even with the active energy ray-curable composition of the present invention, the light irradiation amount itself may be outside of a preferable range.

The polymerization initiator (photopolymerization initiator) used for the curing (photocuring) of the active energy ray-curable composition is not particularly limited, but examples thereof include acetophenones such as 2,2-diethoxyacetoxyphenone, p-dimethylacetophenone, 1-hydroxydimethylphenylketone, 1-hydroxycyclohexylphenylketone, 2-methyl-4-methylthio-2- morpholinopropiophenone, 2-benzyl-2-dimethylamino-1-(4-morpholinophenyl)-butanone, and the like; benzoins such as benzoin methyl ether, benzoin toluenesulfonic ester, benzoin methyl ether, benzoin ethyl ether, benzoin isopropyl ether, and the like; benzophones such as benzophenone, 2,4-diclilorobenzophenone, 4,4-dichlorobenzophenone, p-chlorobenzophenone, and the like; phosphine oxides such as 2,4,6-trimethylbenzoyl diphenyl phosphine oxide, and the like; ketals; anthraquinones; thioxanthones; azo compounds; peroxides; 2,3-dialkyldione compounds; disulfide compounds; fluoroamine compounds; aromatic sulfoniums; and the like. These photopolymerization initiators may be used singly or in combination of two or more kinds thereof.

Furthermore, the active energy ray-curable composition may be cured by using photocuring and thermocuring in combination. The thermopolymerization initiator which is added in the case of using thermocuring in combination is not particularly limited, but examples thereof include azo compounds such as 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, dimethyl-2,2'-azobis(2-methylpropionate), and the like; peroxides such as benzoyl peroxide, t-hexylperoxyneodecanoate, di(3-methyl-3-methoxybutyl)peroxydicarbonate, t-butylperoxyneodecanoate, 2,4-dichlorobenzoylperoxide, t-hexylperoxypivalate, t-butylperoxypivalate, 3,5,5-trimethylhexanoylperoxide, octanoylperoxide, decanoylperoxide, lauroylperoxide, cumylperoxyoctaate, succinic acid peroxide, acetylperoxide, t-butylperoxyisobutyrate 1,1'-bis(t-butylperoxy)-3,3,5-trimethylcyclohexane, 1,1'-bis(t-butylperoxy)cyclohexane, t-butylperoxybenzoate, dicumylperoxide, and the like; and others. These thermopolymerization initiators may be used singly or in combination of two or more kinds thereof.

The transparent molded body of the present invention thus obtained can be expected to be deployed for use as, for example, antireflective members such as an antireflective film (including an antireflective film), an antireflective body, and the like, optical articles such as an optical waveguide, relief hologram, a solar cell, a lens, a polarization separation element, a member for increasing an organic electroluminescence light extraction rate, and the like, or a cell culture sheet. In particular, it is suitable for use as antireflective members such as an antireflective film (including an antireflective film), an antireflective body, and the like.

If the antireflective member has a film shape, it is used by being attached to the surface of objects such as, for example, image display devices such as a liquid crystal display device, a plasma display panel, an electroluminescence display, a cathode ray tube display device, and the like, lenses, show windows, automobile meter covers, spectacle lenses, and the like.

In the case where the antireflective member has a steric shape, a transparent molded body can be prepared in advance using a transparent base having a form depending on its application, and used as a member constituting the surface of the object.

Furthermore, if the object is an image display device, the antireflective member may be attached on the front plate, not limited to the surface, and the front plate itself can also be used to constitute the transparent molded body of the present invention.

As such, since the transparent molded body of the present invention is formed of an active energy ray-curable resin having a fine uneven structure on the surface and the water contact angle of the surface is equal to or less than 25°, the antifouling property is excellent. Furthermore, if the modulus of elasticity of the surface is equal to or more than 200 MPa, the scratch resistance is excellent. Furthermore, if the fine uneven structure has a distance between the adjacent convex portions that is equal to or less than the wavelength of visible light (400 nm), the antireflective property is excellent, and accordingly, it can be particularly suitably used for antireflective members. In addition, if the height of the convex portion is equal to or more than 100 nm, the antireflective property is more excellent.

Furthermore, the antireflective member of the present invention has an excellent antifouling property and antireflective property due to the use of the transparent molded body of the present invention.

Hereinbelow, the present invention will be described in detail with reference to Examples, but the present invention is not limited to these.

<Various Methods for Evaluation and Measurement>

(Assessment of Water Contact Angle)

Using a contact angle measuring device ("DSA10-Mk2" manufactured by KRUSS GmbH), 11.6 µl of water was dropped on the surface of the active energy ray-curable resin that had been prepared in Examples and Comparative Examples as described below, and then the contact angles after ten seconds were then measured at ten one second intervals, and an average value thereof was calculated. The same operations were carried out three times with the change in the positions on which water was dropped, and an average value thereof was calculated to determine the water contact angle.

(Measurement of Modulus of Elasticity)

Using a "FISCHERSCOPE® HM2000" manufactured by Fischer Technology, Inc., a load was increased under a condition of 1 mN/10 seconds, maintained for 10 seconds, and then the load was released under the same condition as the increase in the load. By extrapolation using the points where 65% and 95% of the load were applied at that time, the modulus of elasticity was calculated.

(Antifouling Property Test)

In the method as described in JP-A-2006-147149 (in which a similar fingerprint liquid 1 is prepared and used), the similar fingerprint was adhered to a transparent molded body, an indenter of a 20 mm angle was equipped with flannel cloth that had been wet with water in a reciprocating friction tester ("HEIDON Type: 30S" manufactured by Shinto Scientific Co., Ltd.), and its appearance upon wiping off under the conditions of a load of 100 g, a stroke of 40 mm, and 10 reciprocations was evaluated. After a black paper was placed on the back side of the transparent molded body, the evaluation was carried out according to the following criteria.

A: No soiling was noticeable when visually observed.
B: A little fingerprint was visually found.
C: The fingerprint merely spreads, and thus was substantially not wiped off.

(Scratch Resistance Test)

An indenter of a 20 mm angle was equipped with flannel cloth in a reciprocating friction tester ("HEIDON Type: 30S" manufactured by Shinto Scientific Co., Ltd.), the appearance when the test was carried out under the conditions of a load of 16 g, a stroke of 40 mm, and 5000 reciprocations was visually evaluated. After a black paper was placed on the back side of the transparent molded body, the evaluation was carried out according to the following criteria.

A: No scratches were found at all.
B: A few scratches were found.
C: Scratches were found across the entire surface in contact with the indenter.

(Measurement of Reflectivity)

After the back side was roughened with a sandpaper (GRIT No. 500), the relative reflectivity at a wavelength of from 380 nm to 780 nm of a sample that had been painted black was measured using a spectrophotometer ("U-4100" manufactured by Hitachi, Ltd.) under the condition of an incident angle of 5°, and the weighted average reflectivity was calculated on basis of "JIS R 3106:1998".

(Observation of Uneven Structure by Electron Microscope)

Using a scanning electron microscope ("JSM-7400 F" manufactured by JEOL, Ltd. Japan), the fine uneven structures formed on the surface of the stamper and the transparent molded body were observed under a condition of an accelerating voltage of 3.00 kV. Further, as for the observation of the transparent molded body, observation was carried out after the platina was deposited for 10 minutes. From the obtained image, in the case of the stamper, the distance between the adjacent concave portions and the depth (height) of the concave portion were measured, whereas in the case of the transparent molded body, the distance between the adjacent convex portions and the height of the convex portion were measured.

<Fabrication of Stamper>

After a 99.99% purity aluminum plate was subjected to anodization in an electrolytic liquid of a 2.7% aqueous oxalic acid solution under the conditions of a formation voltage of 40 V and a temperature of 16° C. for 30 minutes, an alumina coated film was selectively removed in a mixed liquid of phosphoric acid and chromic acid. In addition, the anodization was carried out in an electrolytic liquid of a 2.7% aqueous oxalic acid solution under the same condition as above for 30 seconds, a treatment for increasing the hole diameter was carried out for 8 minutes using a 5% aqueous phosphoric acid solution, and an anodization treatment/an opening expansion treatment were further repeated four times. Next, porous alumina was dipped in a solution obtained by the dilution of fluoroalkylsilane ("KBM-7803" manufactured by Shin-Etus Chemical Co., Ltd.) to a solid content of 0.5% with methanol for 10 minutes, then dried with air, and subjected to a heat treatment at 120° C. for 2 hours under reduced pressure, thereby obtaining a stamper.

Furthermore, the surface of the obtained porous alumina was observed with an electron microscope, and as a result, it was found that a fine uneven structure comprising a taper-shaped concave portion having a substantially conical shape with a distance between the adjacent concave portions of 100 nm and a depth of 220 nm was formed.

<Preparation of Transparent Base>

75 parts by weight of a rubber-containing multistage polymer comprising methyl methacrylate, butyl acrylate, methyl acrylate, allyl methacrylate, and 1,3-butadiene and 25 parts by weight of an acryl resin BR80 (manufactured by Mitsubishi Rayon Co., Ltd.) were melt-extruded in advance, followed by film forming, to obtain a 200 μm of an acryl resin film.

Example 1

Preparation of Transparent Molded Body 1.5 parts by weight of Irgacure 184 (manufactured by Ciba Specialty Chemicals Inc.) based on 100 parts by weight of the monomers was dissolved in 20 parts by weight of dipentaerythritol hexaacrylate (DPHA), 70 parts by weight of Aronix M-260 (manufactured by Toagosei Co., Ltd.; the number of the average repeating units of the polyethylene glycol chain: 13), and 10 parts by weight of hydroxyethyl acrylate, thereby obtaining an active energy ray-curable composition. A few drops of the active energy ray-curable composition were dropped on a stamper and coated by spreading on an acryl resin film, and then by the active energy ray-curable composition being photocured by irradiation with an ultraviolet ray at an energy level of 400 mJ/cm$^2$ from the side of the film. The film and the stamper were released to obtain a transparent molded body having a fine uneven structure with a distance w1 between the adjacent convex portions of 200 nm and a height of the convex portion d1 of 200 nm as shown in FIG. 2.

<Evaluations>

Evaluations of the water contact angle, the antifouling property test, the scratch resistance test, and the reflectivity of the obtained transparent molded body were carried out. The results are shown in Table 1.

Furthermore, the surface of the transparent molded body was observed with an electron microscope, and as a result, it was found that 2 to 3 convex portions were united, and accordingly, the distance between the adjacent convex portions was larger than the distance in the stamper.

Example 2

In the same manner as in Example 1, except that 30 parts by weight of dipentaerythritol hexaacrylate (DPHA) and 60 parts by weight of Aronix M-260 (manufactured by Toagosei Co., Ltd.) were used, a transparent molded body having a fine uneven structure with a distance w1 between the adjacent convex portions of 200 nm and a height of the convex portion d1 of 200 nm was prepared, and evaluations of the water contact angle, the antifouling property test, and the reflectivity were carried out. The results are shown in Table 1.

Example 3

In the same manner as in Example 1, except that 40 parts by weight of dipentaerythritol hexaacrylate (DPHA) and 50 parts by weight of Aronix M-260 (manufactured by Toagosei Co., Ltd.) were used, a transparent molded body having a fine uneven structure with a distance w1 between the adjacent convex portions of 200 nm and a height of the convex portion d1 of 200 nm was prepared, and evaluations of the water contact angle, the antifouling property test, and the reflectivity were carried out. The results are shown in Table 1.

Example 4

In the same manner as in Example 1, except that 50 parts by weight of dipentaerythritol hexaacrylate (DPHA) and 40 parts by weight of Aronix M-260 (manufactured by Toagosei Co., Ltd.) were used, a transparent molded body having a fine uneven structure with a distance w1 between the adjacent convex portions of 100 nm and a height of the convex portion d1 of 200 nm was prepared, and evaluations of the water contact angle, the antifouling property test, and the reflectivity were carried out. The results are shown in Table 1.

Example 5

In the same manner as in Example 1, except that a solution obtained by adding 8 parts by weight of an MG polymer (random copolymerized oligomer of quaternary ammonium salt containing methacrylate/long chain polyethylene glycol containing methacrylate=40/60 manufactured by MRC Unitech Co., Ltd.; a 50% methanol solution), relative to 100 parts by weight of the cured active energy ray-curable composition of Example 4, and then removing methanol by distillation was used as an active energy ray-curable solution, a transparent molded body having a fine uneven structure with a distance w1 between the adjacent convex portions of 100 nm and a height of the convex portion d1 of 200 nm was prepared, and evaluations of the water contact angle, the antifouling property test, and the reflectivity were carried out. The results are shown in Table 1.

Example 6

In the same manner as in Example 5, except that 16 parts by weight of an MG polymer (manufactured by MRC Unitech Co., Ltd.; a 50% methanol solution) was added, a transparent molded body having a fine uneven structure with a distance w1 between the adjacent convex portions of 200 nm and a height of the convex portion of 220 nm was prepared, and evaluations of the water contact angle, the antifouling property test, and the reflectivity were carried out. The results are shown in Table 1.

Comparative Example 1

In the same manner as in Example 1, except that 5 parts by weight of dipentaerythritol hexaacrylate (DPHA) and 85 parts by weight of Aronix M-260 (manufactured by Toagosei Co., Ltd.) were used, a transparent molded body having a fine uneven structure with a distance w1 between the adjacent convex portions of 200 nm and a height of the convex portion d1 of 200 nm was prepared, and evaluations of the water contact angle, the antifouling property test, and the reflectivity were carried out. The results are shown in Table 1.

Comparative Example 2

An attempt was made to obtain a transparent molded body having a fine uneven structure in the same manner as in Example 1, except that 60 parts by weight of dipentaerythritol hexaacrylate (DPHA) and 30 parts by weight of Aronix M-260 (manufactured by Toagosei Co., Ltd.) were used. However, small cracks were generated on the cured film, and the appearance had deteriorated. None of the physical properties could be measured.

Comparative Example 3

An attempt was made to obtain a transparent molded body having a fine uneven structure in the same manner as in Example 1, except that 70 parts by weight of dipentaerythritol hexaacrylate (DPHA) and 20 parts by weight of Aronix M-260 (manufactured by Toagosei Co., Ltd.) were used. However, small cracks were generated on the cured film, and the appearance had deteriorated. None of the physical properties could be measured.

Comparative Example 4

In the same manner as in Example 1, except that 51.2 parts by weight of dipentaerythritol hexaacrylate (DPHA), 23.2 parts by weight of Aronix M-260 (manufactured by Toagosei Co., Ltd.), and 25.6 parts by weight of hydroxyethyl acrylate were used, a transparent molded body having a fine uneven structure with a distance w1 between the adjacent convex portions of 100 nm and a height of the convex portion d1 of 200 nm was prepared, and evaluations of the water contact angle, the antifouling property test, and the reflectivity were carried out. The results are shown in Table 1.

Comparative Example 5

In the same manner as in Example 1, except that 56.4 parts by weight of dipentaerythritol hexaacrylate (DPHA), 15.4 parts by weight of Aronix M-260 (manufactured by Toagosei Co., Ltd.), and 28.2 parts by weight of hydroxyethyl acrylate were used, a transparent molded body having a fine uneven structure with a distance w1 between the adjacent convex portions of 100 nm and a height of the convex portion d1 of 200 nm was prepared, and evaluations of the water contact angle, the antifouling property test, and the reflectivity were carried out. The results are shown in Table 1.

Comparative Example 6

In the same manner as in Example 1, except that 32 parts by weight of dipentaerythritol hexaacrylate (DPHA), 48 parts by weight of Aronix M-240 (manufactured by Toagosei Co., Ltd.), and 20 parts by weight of hydroxyethyl acrylate were used, a transparent molded body having a fine uneven structure with a distance w1 between the adjacent convex portions of 100 nm and a height of the convex portion d1 of 200 nm was prepared, and evaluations of the water contact angle, the antifouling property test, and the reflectivity were carried out. The results are shown in Table 1.

Comparative Example 7

In the same manner as in Example 1, except that 49 parts by weight of dipentaerythritol hexaacrylate (DPHA), 32 parts by weight of Aronix M-240 (manufactured by Toagosei Co., Ltd.), and 19 parts by weight of hydroxyethyl acrylate were used, a transparent molded body having a fine uneven structure with a distance w1 between the adjacent convex portions of 100 nm and a height of the convex portion d1 of 200 nm was prepared, and evaluations of the water contact angle, the antifouling property test, and the reflectivity were carried out. The results are shown in Table 1.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- | --- | --- | --- | --- | --- | --- |
| DPHA | 20 | 30 | 40 | 50 | 50 | 50 | 5 | 60 | 70 | 51.2 | 56.4 | 32 | 49 |
| Aronix M-260 | 70 | 60 | 50 | 40 | 40 | 40 | 85 | 30 | 20 | 23.2 | 15.4 | 0 | 0 |
| Aronix M-240 | 0 | 0 | 0 | 0 | 0 | 0 | 0 | 0 | 0 | 0 | 0 | 48 | 32 |
| HEA | 10 | 10 | 10 | 10 | 10 | 10 | 10 | 10 | 10 | 25.6 | 28.2 | 20 | 19 |
| MG polymer | 0 | 0 | 0 | 0 | 8 | 16 | 0 | 0 | 0 | 0 | 0 | 0 | 0 |

TABLE 1-continued

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- | --- | --- | --- | --- | --- | --- |
| Water contact angle [°] | 18.0 | 19.2 | 18.5 | 20.4 | 16.5 | 17.8 | 19.7 | Cannot be measured | Cannot be measured | 31 | 27.6 | 27.7 | 25.5 |
| Modulus of Elasticity [MPa] | 306 | 541 | 937 | 1435 | 1181 | 1071 | 128 | 2065 | 2508 | 2055 | 2830 | >200 | >200 |
| Scratch Resistance Test | A | A | A | A | A | A | C | Cannot be measured | Cannot be measured | A | A | A | A |
| Antifouling Property | A | A | A | A | A | A | A | Cannot be measured | Cannot be measured | C | C | C | C |
| Reflectivity | 0.12 | 0.16 | 0.20 | 0.12 | 0.10 | 0.10 | 0.11 | Cannot be measured | Cannot be measured | 0.13 | 0.16 | 0.20 | 0.20 |

As clearly seen from Table 1, the transparent molded bodies of the Examples have a water contact angle equal to or less than 25° and exhibit an effect in which fingerprints are wiped off when washed with water, whereby it was possible to wipe off the fingerprints to a degree that one could not visually notice them. Also, the transparent molded bodies of the Examples have a surface modulus of elasticity equal to or more than 200 MPa, and are thus excellent in the scratch resistance, but the no scratches after the test were seen. Further, all of them were low reflectivity transparent molded bodies having a low dependency on the wavelength.

On the other hand, for the transparent molded bodies of the Comparative Examples, in those having a water contact angle of more than 25°, the effect of wiping off the fingerprint by wiping with water was reduced, as compared to Examples, and those having a modulus of elasticity of less than 200 MPa had remarkably deteriorated scratch resistance. Furthermore, in those having less than 6 repeating units of polyethylene glycol, the effect of wiping off the fingerprint when wiped with water was reduced, as compared to Examples.

INDUSTRIAL APPLICABILITY

Since the transparent molded body of the present invention is formed of an active energy ray-curable resin having a fine uneven structure on the surface and the water contact angle of the surface is equal to or less than 25°, the antifouling property is excellent. Furthermore, if the modulus of elasticity of the surface is equal to or more than 200 MPa, the scratch resistance is excellent. Furthermore, if the fine uneven structure has a distance between the adjacent convex portions equal to or less than the wavelength of visible light (400 nm), the antireflective property is excellent, and accordingly, it can be particularly suitably used for an antireflective member. In addition, if the height of the convex portion is equal to or more than 100 nm, the antireflective property is more excellent.

Furthermore, the antireflective member of the present invention has an excellent antifouling property and the antireflective property due to the use of the transparent molded body of the present invention.

The invention claimed is:

1. A transparent molded body comprising a transparent substrate and an uneven layer composed of a cured product of an active energy ray-curable composition formed on at least one surface of the transparent substrate, wherein the uneven layer has an uneven structure having a gap between the adjacent convex portions equal to or less than the wavelength of visible light, the water contact angle of the surface of the uneven layer is equal to or less than 25°, and the modulus of elasticity of the surface of the uneven layer is equal to or more than 200 MPa.

2. The transparent molded body as described in claim 1, wherein the active energy ray-curable resin for forming the uneven layer comprises a polymer composed of 10 to 50 parts by weight of tetrafunctional or greater polyfunctional (meth)acrylate units, 30 to 80 parts by weight of bifunctional or greater hydrophilic (meth)acrylate units, and 0 to 20 parts by weight of monofunctional monomer units.

3. The transparent molded body as described in claim 2, wherein the bifunctional or greater hydrophilic (meth)acrylate units are polyethylene glycol diacrylate units wherein the number of the average repeating units of ethylene glycol: 6 to 40.

4. The transparent molded body as described in claim 2, wherein the bifunctional or greater hydrophilic (meth)acrylate units are polyethylene glycol diacrylate units wherein the number of the average repeating units of ethylene glycol: 9 to 30.

5. An antireflective member obtained by using the transparent molded body as described in any one of claims 1 to 4.

* * * * *